Sept. 16, 1941.  G. A. TINNERMAN  2,256,419
KNOB CONNECTION OR THE LIKE
Filed Jan. 8, 1940
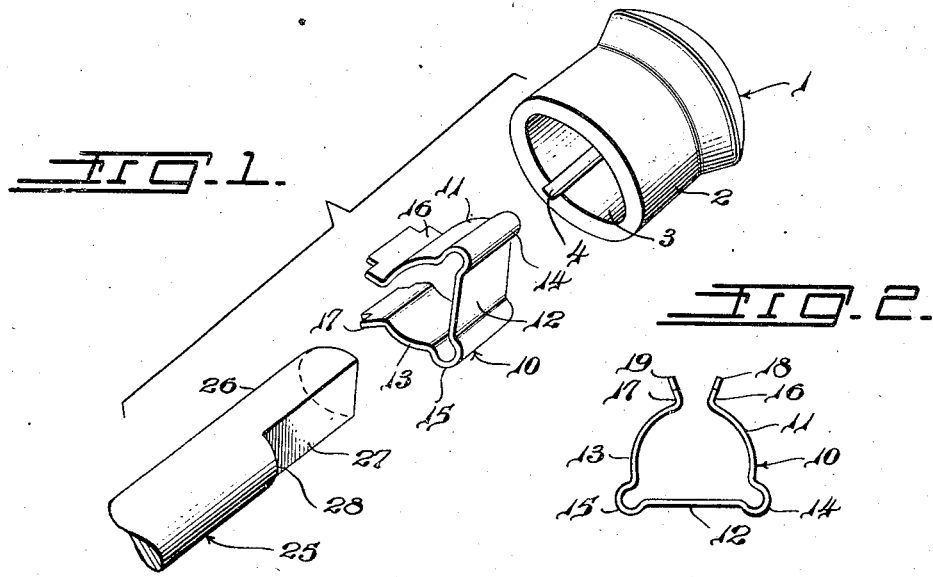
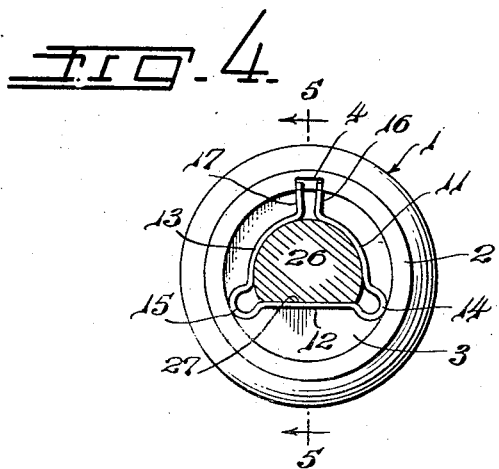
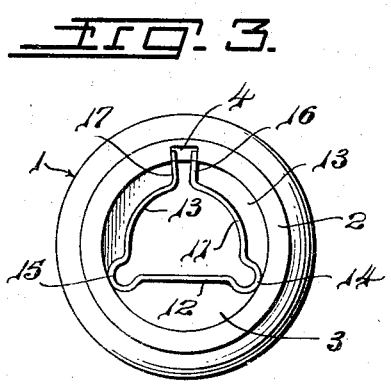
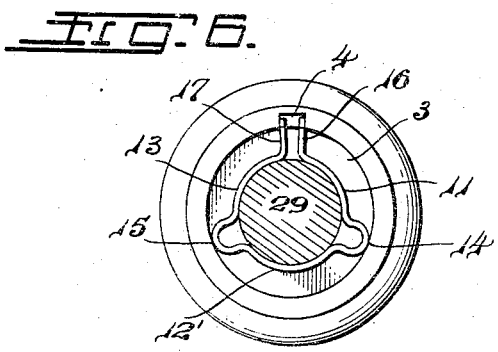
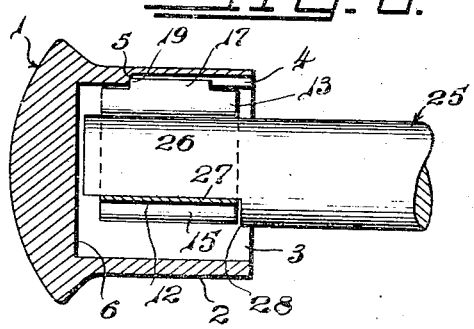
Inventor:
GEORGE A. TINNERMAN
By H. G. Lombard
Attorney Patented Sept. 16, 1941

2,256,419

UNITED STATES PATENT OFFICE 2,256,419

KNOB CONNECTION OR THE LIKE

George A. Tinnerman, Cleveland, Ohio, assignor to Tinnerman Products, Inc., Cleveland, Ohio, a corporation of Ohio Application January 8, 1940, Serial No. 313,003

11 Claims. (Cl. 287—53)

This invention is directed to an improved connection for securing a knob, handle or other article of manufacture to a cooperating shaft, rod, spindle or the like in fixedly held position against relative rotative as well as relative axial movement for use in effecting axial thrust-like operations or for the purpose of transmitting or receiving a relatively small torque without resulting in objectionable looseness, wobble, and side play in the connection.

This present application is a continuation in part of a prior copending application Serial Number 243,436, filed December 1, 1938 and which has since issued as United States Patent Number 2,190,577 February 13, 1940.

More particularly, the present invention deals with an improved connection for detachably securing an operating member or similar article of manufacture to a shaft or shaft stem employed, for example, as the operating member for an adjustable control unit.

A primary object of the invention is to provide a simple, inexpensive means for attaching a knob or the like to a shaft in a rigid connection which prevents relative rotation between the knob and shaft in operation and use, and yet permits ready and easy removal of the knob from the shaft as may be necessary or desirable.

Another principal object of the invention is to provide a knob connection or the like of this character embodying a substantial spring holding clip adapted to secure the knob and shaft in rigid connected engagement in such a manner as to compensate for slight variations in shaft size.

A further object of the invention is directed to a connection for a knob and shaft comprising a spring holding clip of a character designed to resiliently embrace the shaft over a major portion of its periphery together with means having frictional bearing engagement in a recess in the body of the knob or the like to maintain the knob and shaft in rigid connected engagement.

Still another object of the invention is to provide such a knob connection or the like including positive means preventing relative rotation or shifting movement of the spring holding clip and knob or other operating member connected to the shaft thereby.

A further object of the invention is to provide a means for connecting a knob or like part to a shaft by an improved construction in which neither the knob nor the shaft is weakened and separate, automatic, spring clip retaining means is applied to a recess in the knob or other part in such manner as to form a socket opening receiving the shaft and otherwise provide a connection under continuously effective spring tension whereby the knob is rigidly and fixedly secured to the shaft.

A more specific object contemplates the provision of such means for connecting a part to a shaft stem having a flat side face and designed for abutting relation with a correspondingly shaped bearing surface of the socket opening presented by the spring holding clip in providing a connection in which the part secured is held on the shaft stem against relative rotative as well as relative axial movement.

A still further object is to provide a connection for a knob or the like operating member embodying a spring holding clip in the form of a substantial collar which is of simple inexpensive construction, easily and cheaply manufactured, and yet strong and durable to provide an efficient, highly satisfactory connection over a long period of use.

Further objects and advantages, and other new and useful features in the construction, arrangement and general combination of parts of the invention, will be readily apparent to those skilled in the art as a description thereof proceeds with reference to the accompanying drawing in which like reference characters designate like parts throughout the same, and in which:

Fig. 1 is a perspective view of the component parts of a preferred embodiment of the improved connecting means of the invention;

Fig. 2 is a view in end elevation of one form of the spring collar clip fastening device per se;

Fig. 3 is a view looking to the underside of a knob or the like showing the spring collar fastening device as initially assembled in a recess in said knob;

Fig. 4 is a similar view showing the spring collar as assembled in the knob and connected to a shaft stem represented in section;

Fig. 5 is a sectional view of the completed knob assembly of Fig. 4 taken along line 5—5 looking in the direction of the arrows with the shaft stem represented in elevation; and, Fig. 6 is a view similar to Fig. 4 of a modification in which the spring collar is designed for connecting the knob with a generally round shaft stem, shown in section.

A principal purpose of the invention is for the provision of simple and inexpensive form of substantial clip fastening device adapted for quick and easy assembly with an operating member such as a rotatable knob, handle or any other article of manufacture so as to enable a shaft or the like to be detachably secured to such article. A most important advantage of the invention resides in the relative construction of the clip fastening device and the article of manufacture enabling the fastening device to be fixedly assembled therewith in a minimum of time and effort in proper position for rigidly connecting the article to a shaft or similar member such as a rod, spindle, or the like.

For purposes of illustration, a preferred form of the clip fastening device is shown and described as employed with knob members or the like for adjustable control shafts such as may be used on radio dial panels, automobile and aeroplane instrument panels or the valve handles on stove burners units and the like, but it is to be understood that the fastening device is not limited in its use to operating members of the type disclosed inasmuch as the same is equally adaptable to use as the means for securing, mounting or connecting various other articles of manufacture in a similar or equivalent relation as will be readily apparent from the description which follows.

Referring now, more particularly, to the drawing, Figs. 1 to 5 inclusive disclose an application of the improved connecting means as employed for an instrument control shaft of a radio apparatus, for example. The knob or similar operating member designated generally 1, is formed of any suitable material as in the manner of a metallic die casting or of a hardened plastic composition molded into a simple, compact one-piece device of any selected size or shape. Usually the knob is substantially annular in outward appearance and generally cup-shaped in section to provide an imperforate body 2, and if desired, a peripheral flange on which may be formed dial graduations, pointers, symbols, and similar indicating means in a well known manner.

In any event, the knob, handle or other article of manufacture of any selected size and shape is provided with a recess 3, which of course may be of any suitable cross-section but is preferably cylindrical inasmuch as the molding equipment required therefor is the simplest and least expensive, and such recess if necessary may be provided in any article of manufacture by an expedient boring or drilling operation. A further advantage of this construction resides in the fact that the knob, handle or other article of manufacture may be provided as a simple, hollow, one-piece device such that in quantity production, a considerable saving is obtained in the amount of plastic material required and other costs of manufacture. At the same time, the use of special connecting hub elements may be dispensed with entirely together with the objectionable tendency of such connecting hubs to split or crack from their foundations either in the initial attachment of the shaft thereto or incident to strain after a period of use in an installation. In this respect, it will be understood that the connecting means of the present invention involves a most decided advance in the art in that it eliminates entirely the necessity for strengthening ribs, webs, inserts and similar reinforcing means heretofore found necessary in the provision of such connecting means for knobs and similar articles of manufacture.

The said recess 3 extends substantially axially of the knob and radially disposed with respect thereto is an axial kerf or slot 4, which as shown in Fig. 5, need not extend the full depth of the knob recess 3, thereby presenting a substantial abutment 5 spaced from the bottom wall 6, thereof; said slot 4 otherwise is of a suitable width to present pronounced, substantially straight shoulders of a predetermined spacing for a purpose hereinafter appearing.

With the knob or other object formed with a recess in the manner aforesaid, there is provided a spring holding clip fastening device in the manner of a resilient substantial collar 10 which is of such design as to be received within said recess in rigid, frictional bearing engagement with the side walls thereof under a compressive force serving to provide a continuous spring holding action of the clip in connected engagement with the shaft applied thereto, as presently to be described. The said spring collar device may be constructed of any suitable material but preferably is formed from a relatively small, inexpensive strip or stamped section of spring steel or similar sheet metal of a spring metal nature.

The strip or section of spring metal is bent in substantially the manner illustrated in Fig. 2 to provide a preferred form of resilient spring collar fastening device comprising the substantially concentrically arranged bearing surfaces 11, 12, 13, spaced by outwardly projecting ribs 14, 15, formed by substantially U-shaped bends or similar corrugations at predetermined points intermediate the ends of the strip. The strip may be provided with any suitable number of such projecting ribs 14, 15, forming a proportionate number of bearing surfaces which are so shaped as to provide a central socket opening corresponding substantially with the periphery of the shaft to be employed. In the present example, the shaft includes a stem of substantially D-shaped cross-section and consequently any one of the bearing surfaces of the fastening device, preferably the mid-section 12 is formed substantially flat to present a generally D-shaped socket opening corresponding substantially thereto in the completed form of the clip shown in Fig. 2.

The extremities of the spring collar are bent outwardly from the strip in a manner to provide radially projecting tongues 16, 17, normally in a spaced relation substantially as shown in Fig. 2. It will be understood that the overall cross-sectional area of the spring collar is defined by the projecting ribs 14, 15 and said tongues 16, 17, this cross-sectional area being slightly greater than the diameter of the recess 3 in the knob whereby the spring collar may be tightly received in such recess to be frictionally retained therein. In the present example, the radially projecting tongues 16, 17, are designed of such length as to extend in the radial slot 4 in the knob body, and in the untensioned relation of the spring collar as shown in Fig. 2, have a normal spacing greater than the width of said slot 4 to resiliently engage the shoulders presented thereby in the assembled position of the clip within the knob, as presently to be described.

The spring collar thus provided is easily and quickly assembled with the knob simply by squeezing or pressing together as necessary the spaced tongues 16, 17, from the position shown in Fig. 2, to fit into radial slot 4 in the knob body, the remainder of the clip thereupon being readily received in the knob recess and capable of being pressed axially thereof to its final assembled position therein as shown in Fig. 3. It will be appreciated that the assembly of the spring collar within the knob in this manner may be readily accomplished by any suitable tool such as a pair of pliers compressing the tongues 16, 17 toward each other sufficient to fit into the slot 4 in the knob body, the clip thereby being fully received in the knob recess 3 whereupon the tool is removed and the spring collar permitted to expand such that the radially projecting tongues 16, 17, resiliently engage the shoulders presented by said radial slot 4, thereby automatically holding the clip in self retaining assembled position with the knob or other article of manufacture. In this relation the projecting ribs 14, 15, of the clip frictionally engage the adjacent side wall portions of the knob recess 3, as shown in Fig. 3, while the bearing surfaces 11, 12 and 13 are substantially concentrically arranged with respect to the knob body to present a centrally disposed socket opening adapted for receiving any of several sizes of shafts to frictionally and grippingly hold the same in connected engagement with the knob or other article of manufacture. By reason of the abutting relation of the radially projecting tongues 16, 17, with the shoulders presented by said slot 4, there is eliminated any possibility of the spring collar turning or rocking relatively to the knob, while inward relative axial movement thereof within the knob body may of course be prevented by disposing the inner end of the spring collar against the bottom wall of the knob recess. However, in many instances the relative construction of the knob and shaft in an installation makes it necessary or desirable for the inner end of the spring collar to be disposed in spaced relation to the bottom wall 6 of the knob recess substantially as shown in Fig. 5. Accordingly, the tongues 16, 17, may be suitably notched at their corner edges to provide offset stops 18, 19, respectively, adapted to limit the inward movement of the spring collar within the knob recess. By providing similar stops 18, 19, on both corner edges of said tongues 16, 17, either end of the spring collar may be applied to the knob recess 3, as aforesaid, and advanced axially thereof to substantially the position illustrated in Fig. 5, where the offset stop 19 on the tongue 17 is shown engaging the abutment 5 in the radial slot 4 to limit further inward movement of the spring collar within the knob body and otherwise maintain the inner end of the spring collar in the desired predetermined spaced relation to the bottom wall 6 of the knob recess.

The shaft itself, designated generally 25, is usually plain round rod material but of course may be of any other selected stock so long as it is provided with a stem 26 of substantially D-shaped cross-section receivable in the D-shaped socket opening presented by the bearing surfaces 11, 12 and 13 of the spring collar. Naturally, round stock is the most desirable since it is the cheapest and requires only a simple, expeditious cutting or grinding operation along one side to provide a cut-away portion forming the desired, substantially D-shaped stem embodying a flat face 27 and including a shoulder 28 at the inner end thereof.

Accordingly, as best seen in Figs. 3 and 4 the D-shaped shaft stem 26 thus provided is of a cross-section corresponding substantially to the D-shaped socket opening presented by the bearing surfaces 11, 12 and 13 of the spring collar in the compressed assembled relation thereof in the knob recess as shown in Fig. 3. Said socket opening is thus adapted to receive the D-shaped shaft stem with the flat face 27 thereof in abutting relation with the flat bearing surface 12 of the spring collar substantially as shown in Fig. 4, thereby eliminating any possibility of relative movement of the shaft and clip upon turning movements of the knob.

It will be understood that the socket opening presented by the clip in the assembled relation thereof in the knob recess as shown in Fig. 3, is of slightly smaller cross-section than that of the cooperating D-shaped shaft in order to receive the same in a friction, press fit providing a firm, rigid connection. Inasmuch as the bearing surfaces 11, 12 and 13 of such socket opening are resilient the spring collar not only is adapted to receive several sizes of such shafts, but also, is admirably suited to compensate for irregularities and manufacturing variations in the shape of the shaft stems which, of course, must be expected in mass production. Thus, there is seldom any necessity for special dressing operations of the usual number of shaft stems which do not properly fit the socket openings provided, as in similar connections heretofore available which in practically every instance, require that the shaft be of precise, exact size for obtaining an effective connection of the shaft and knob or other part to be attached.

Usually the spring collar is first applied to assembled relation in the recess of the knob or other part to be attached as shown in Fig. 3, thereafter receiving the shaft in a completed installation, as aforesaid. In certain instances, it is a more expeditious procedure first to position the spring holding clip onto the shaft stem and then apply the assembly to the recess in the knob or other part to be connected thereto; since the shoulder 28 on the shaft engages the adjacent end of the clip in the area of the bearing surface 12 as shown in Fig. 5, this method of assembly may be accomplished with a minimum of effort, simply by pressing the respective parts toward each other as necessary.

In any event, the stem 26 provided on the shaft is readily introduced into the socket opening presented by the bearing surfaces 11, 12 and 13 of the clip and to facilitate such application of the shaft stem, the same may be provided with a tapered extremity whereupon it is easily forced between said bearing surfaces and advanced axially of the knob body to final connected position and, if desired, with the shoulder 28 thereof in abutting relation with adjacent end of the clip in the area of the bearing surface 12 substantially as shown in Fig. 5, in which relation the rigidity of the connection is materially enhanced.

From the foregoing, it will be understood that in the application of the shaft stem 26 to the socket opening presented by the bearing surfaces 11, 12 and 13 of the spring collar employed in the present invention, such bearing surfaces exert a resilient, spring gripping and clamping action against the shaft stem at all times to maintain the same in firm, rigid, connected engagement with the knob, handle or other article of manufacture attached thereto. Since the shaft stem is preferably of substantially D-shaped cross-section comprising a flat side face 27 which is disposed against the flat bearing surface 12 of the clip as shown in Fig. 4, with the tongues 16, 17 of said clip in abutting relation with the shoulders presented by the radial slot 4 in the knob body, it will be apparent that the cooperating parts secured by the connection are held positively against relative rotative movement at all times. Further, since the shaft is designed to be applied to the socket opening presented by the bearing surfaces of the spring collar in a friction, press fit, the spring collar is thereby expanded and otherwise tensioned in frictionally and grippingly engaging the shaft stem to hold the knob and shaft against relative axial movement as well as relative rotative movement. It will be appreciated therefore, that the connecting means of the present invention embodying a spring collar connecting clip which may simply be pushed onto a shaft stem to final connected fastening position, is admirably suited for securing a knob, handle or the like to be detachably mounted onto the projecting stem of a control shaft extending through a panel of a radio apparatus or a stove burner unit, for example, in which the shaft is not readily accessible from the rearward side of the panel for the use of set screws and similar fastenings requiring tools for securing the knob thereto.

It will be further appreciated that the connecting means of the present invention marks a decided advance in the art in that various articles of manufacture may be designed to be mounted in an installation without the use of strengthening webs, inserts and similar reinforcing means and in such a manner that a knob, handle or other part is held positively on the shaft against relative rotative as well as relative axial movement at all times under continuously effective spring tension inherent in the construction of the spring collar as designed to receive the cooperating shaft stem applied thereto in a friction, press fit. In this relation, it will be understood that the larger portion of the thrust and strain taking place in the connection incident to turning movements and other operations, is taken up more particularly by the bearing surfaces 11, 12 and 13 of the spring collar and thus, in the event the knob was made of plastic material, such thrust and strain would not be transmitted to the relatively fragile material of the knob body wherefore possibility of chipping or cracking of the plastic material thereof is greatly minimized and practically completely eliminated.

Fig. 6 illustrates a modification in which the spring collar is designed to receive a substantially round shaft stem. The spring collar in this form of the invention is substantially similar in construction, function and use to that described with reference to Figs. 1 to 5 inclusive except for the intermediate bearing surface 12' which is curved in accordance with the contour of the shaft stem to provide a generally round socket opening for receiving the substantially round shaft or shaft stem 29. The bearing surfaces forming such socket opening otherwise are designed for receiving the shaft in a friction press fit and since the same engage the shaft over a major portion of its periphery, the shaft is frictionally and grippingly engaged thereby in the most effective manner to retain the knob or other part in connected position thereon against relative rotative as well as relative axial movement.

The instant invention involves a most simple, inexpensive clip fastening device construction making for a highly practical form of connecting arrangement by which a knob or other article of manufacture may be easily and quickly connected to a shaft or the like by means of the spring collar automatically gripping the shaft in positive, rigid, clamping engagement under continuously effective spring tension against relative rotative as well as relative axial movement. As respects relative axial movement, even greater efficiency and a substantially positive locked connection may be obtained simply by providing coengaging teeth, ribs knurling, etc. on adjacent cooperating surfaces of the shaft stem and spring collar.

It is to be further appreciated that the improved connection of the present invention is such as to be particularly suited for use with articles formed of plastic compositions and other fragile materials inasmuch as the spring collar connecting clip is so designed as to take practically the entire thrust and strain set up by the shaft thereby practically eliminating any possibility of splitting or breaking of the plastic knob, handle or other part when employed either for turning operations as in a rotary panel knob, or as a push-pull operating device.

Though the description and drawing refer to the invention as incorporated in a panel knob such as used in radio apparatus, for example, it will be understood that the instant connecting means is equally applicable wherever any article of manufacture is to be secured to a shaft, rod, spindle, etc., or in any installation in which an operating member is to be mounted by sliding over the end of a shaft or applied to a shaft stem to effect axial movements thereto or for the purpose of transmitting or receiving a relatively small torque.

And while the invention has been described in detail with specific examples, such examples are intended as illustrations only, since it will be apparent to those skilled in the art that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. In a connection of a shaft having a flat side face and an operating member provided with a recess receiving said shaft, a spring collar connecting device comprising a section of sheet metal providing a hollow, generally tubular body defining a plurality of cooperating bearing surfaces spaced by a substantial rib, said rib projecting outwardly of said generally tubular body and being adapted to frictionally engage the wall of said recess in the operating member with said cooperating bearing surfaces defining a socket opening receiving the shaft in resilient, gripping engagement therewith, one of said bearing surfaces comprising a substantially flat portion having nonrotatable abutting relation with said flat side face of the shaft.

2. In a connection of a shaft and an operating member provided with a shaft receiving recess including a radial slot, a spring collar connecting device comprising a section of sheet metal providing a hollow, generally tubular body defining a plurality of cooperating bearing surfaces spaced by a substantial rib, said rib projecting outwardly of said generally tubular body and being adapted to frictionally engage the wall of said recess in the operating member with said cooperating bearing surfaces spaced from said wall and defining a socket opening receiving the shaft in resilient, gripping engagement therewith, and a tongue on said body of the spring collar disposed in the radial slot of said recess in the operating member for preventing relative rotation of the spring collar in said recess.

3. In a connection of a shaft having a flat side face and an operating member provided with a shaft receiving recess including a radial slot, a spring collar connecting device comprising a section of sheet metal providing a hollow, generally tubular body defining a plurality of cooperating bearing surfaces spaced by a bent portion forming a substantial rib, said rib projecting outwardly of said generally tubular body and being adapted to frictionally engage the wall of said recess in the operating member with said cooperating bearing surfaces spaced from said wall and defining a socket opening receiving the shaft in resilient, gripping engagement therewith, one of said bearing surfaces comprising a substantially flat portion having nonrotatable abutting relation with said flat side face of the shaft, and a tongue on said body of the spring collar disposed in the radial slot of said recess in the operating member for preventing relative rotation of the spring collar in said recess.

4. In a connection of a shaft and an operating member provided with a recess receiving said shaft, a spring collar connecting device comprising a section of sheet metal providing a hollow, generally tubular body defining a plurality of cooperating bearing surfaces spaced by substantial ribs, said ribs projecting outwardly of said generally tubular body and being adapted to frictionally engage the wall of said recess in the operating member to maintain said cooperating bearing surfaces spaced from said wall and defining a socket opening receiving the shaft in resilient, gripping engagement therewith.

5. In a connection of a shaft having a flat side face and an operating member provided with a recess receiving said shaft, a spring collar connecting device comprising a section of sheet metal providing a hollow, generally tubular body including a plurality of cooperating bearing surfaces spaced by bent portions forming substantial ribs, said ribs projecting outwardly of said generally tubular body and being adapted to frictionally engage the wall of said recess in the operating member to maintain said cooperating bearing surfaces spaced from said wall and defining a socket opening receiving the shaft in resilient, gripping engagement therewith, one of said bearing surfaces comprising a substantially flat portion having nonrotatable abutting relation with said flat side face of the shaft.

6. In a connection of a shaft and an operating member provided with a shaft receiving recess including a radial slot, a spring collar connecting device comprising a section of sheet metal providing a hollow, generally tubular body defining a plurality of cooperating bearing surfaces spaced by a plurality of substantial ribs, said ribs projecting outwardly of said generally tubular body and being adapted to frictionally engage the wall of said recess in the operating member to maintain said cooperating bearing surfaces spaced from said wall and defining a socket opening receiving the shaft in resilient, gripping engagement therewith, and a tongue on said body of the spring collar disposed in the radial slot of said recess in the operating member for preventing relative rotation of the spring collar in said recess.

7. In a connection of a shaft having a flat side face and an operating member provided with a shaft receiving recess including a radial slot, a spring collar connecting device comprising a section of sheet metal providing a hollow, generally tubular body defining a plurality of cooperating bearing surfaces spaced by a plurality of bent portions forming substantial ribs, said ribs projecting outwardly of said generally tubular body and being adapted to frictionally engage the wall of said recess in the operating member to maintain said cooperating bearing surfaces spaced from said wall and defining a socket opening receiving the shaft in resilient, gripping engagement therewith, one of said bearing surfaces comprising a substantially flat portion having nonrotatable abutting relation with said flat side face of the shaft, and a tongue on said body of the spring collar disposed in the radial slot of said recess in the operating member for preventing relative rotation of the spring collar in said recess.

8. A fastening device for connecting a shaft with an operating member provided with a recess including a radial slot, said fastening device comprising a strip of metal in the form of a substantial spring collar receivable in said recess and having its end portions bent to provide outwardly projecting tongues receivable in said radial slot to prevent relative rotation of said spring collar with respect to said operating member, said spring collar providing a socket opening for the shaft comprising cooperating bearing surfaces spaced by a substantial rib, said bearing surfaces defining the body of the spring collar and said rib projecting outwardly of said bearing surfaces and being adapted to engage the wall of said recess in the operating member in maintaining said bearing surfaces spaced from said wall in connected engagement with the shaft.

9. A fastening device for connecting a shaft having a substantially flat side face with an operating member provided with a recess including a radial slot, said fastening device comprising a strip of metal in the form of a substantial spring collar receivable in said recess and having its end portions bent to provide outwardly projecting tongues receivable in said radial slot to prevent relative rotation of said spring collar with respect to said operating member, said spring collar providing a socket opening for the shaft comprising cooperating bearing surfaces spaced by a substantial rib, said bearing surfaces defining the body of the spring collar and said rib projecting outwardly of said bearing surfaces and being adapted to engage the wall of said recess in the operating member in maintaining the spring collar body spaced from said wall in connected engagement with the shaft, one of said bearing surfaces comprising a substantially flat portion of the strip designed for nonrotatable abutting relation with said flat side face of the shaft.

10. A fastening device for connecting a shaft with an operating member provided with a recess including a radial slot, said fastening device comprising a strip of metal in the form of a substantial spring collar receivable in said recess and having its end portions bent to provide outwardly projecting tongues receivable in said radial slot to prevent relative rotation of said spring collar with respect to said operating member, said spring collar providing a socket opening for the shaft comprising cooperating bearing surfaces spaced by bent portions forming a plurality of substantial ribs, said ribs projecting outwardly of said bearing surfaces and being adapted to engage the wall of said recess in the operating member in maintaining the same in connected engagement with the shaft.

11. A fastening device for connecting a shaft having a substantially flat side face with an operating member provided with a recess including a radial slot, said fastening device comprising a strip of metal in the form of a substantial spring collar receivable in said recess and having its end portions bent to provide outwardly projecting tongues receivable in said radial slot to prevent relative rotation of said spring collar with respect to said operating member, said spring collar providing a socket opening for the shaft comprising cooperating bearing surfaces spaced by bent portions forming a plurality of substantial ribs, said ribs projecting outwardly of said bearing surfaces and being adapted to engage the wall of said recess in the operating member in maintaining the same in connected engagement with the shaft, one of said bearing surfaces comprising a substantially flat portion of the strip designed for nonrotatable abutting relation with said flat side face of the shaft.

GEORGE A. TINNERMAN.